US007482581B2

(12) United States Patent
Lange et al.

(10) Patent No.: US 7,482,581 B2
(45) Date of Patent: Jan. 27, 2009

(54) FOURIER TRANSFORM MASS SPECTROMETER AND METHOD FOR GENERATING A MASS SPECTRUM THEREFROM

(75) Inventors: Oliver Lange, Bremen (DE); Andreas Wieghaus, Bremen (DE)

(73) Assignee: Thermo Finnigan LLC, San Jose, CA (US)

( * ) Notice: Subject to any disclaimer, the term of this patent is extended or adjusted under 35 U.S.C. 154(b) by 202 days.

(21) Appl. No.: 10/592,742

(22) PCT Filed: Mar. 24, 2005

(86) PCT No.: PCT/EP2005/003368

§ 371 (c)(1), (2), (4) Date: Sep. 13, 2006

(87) PCT Pub. No.: WO2005/093783

PCT Pub. Date: Oct. 6, 2005

(65) Prior Publication Data

US 2007/0176091 A1 Aug. 2, 2007

(30) Foreign Application Priority Data

Mar. 26, 2004 (DE) ................................ 0406878.9

(51) Int. Cl.
*B01D 59/44* (2006.01)
*H01J 49/00* (2006.01)

(52) U.S. Cl. ........................ 250/282; 250/281; 250/283; 250/290; 250/291; 250/297

(58) Field of Classification Search ................. 250/281, 250/282, 283, 290, 291, 297
See application file for complete search history.

(56) References Cited

U.S. PATENT DOCUMENTS 4,650,999 A 3/1987 Fies et al.

(Continued)

FOREIGN PATENT DOCUMENTS

GB 2353632 A 2/2001

(Continued)

OTHER PUBLICATIONS

Heeren, R.M.A., Boon J.J. "Rapis microscale analyses with an external ion source Fourier transform ion cyclotron resonance mass spectrometer" International Journal of Mass Spectrometry and Ion Processes vol. 157/158 (1996), pp. 391-403.*

(Continued)

*Primary Examiner*—David A. Vanore
*Assistant Examiner*—Meenakshi S Sahu
(74) *Attorney, Agent, or Firm*—Charles B. Katz; Thomas F. Cooney

(57) ABSTRACT

A method of generating a mass spectrum from an FTMS is disclosed. A first quantity of ions from a source, having a first m/z range, is captured and detected in the FTMS measurement cell to produce a first output. A second quantity of ions, having a second m/z range which at least partially does not overlap with the first m/z range, is then captured and detected so as to produce a second output. The two outputs are then combined using a processor so as to "stitch" together the outputs, which may be FTMS transients or may first be Fourier Transformed into the frequency mass domain, into a composite output from which a composite mass spectrum covering the full range of m/z ratios included by the first and second ranges can be produced.

34 Claims, 6 Drawing Sheets

U.S. PATENT DOCUMENTS

| | | | | |
|---|---|---|---|---|
| 5,436,447 | A | 7/1995 | Shew | |
| 5,479,012 | A | 12/1995 | Wells | |
| 2003/0211628 | A1 * | 11/2003 | Griffey et al. | 436/173 |

FOREIGN PATENT DOCUMENTS

| | | | |
|---|---|---|---|
| WO | WO 02/086946 | A1 | 10/2002 |

OTHER PUBLICATIONS

Dey, M. Castoro, J.A. and Wilkins C.L., "Determination of Molecular Weight Distributions of Polymers by MALDI-FTMS" Anal. Chem. vol. 67, (1995) pp. 1575 to 1579.*

Heeren, et al., "Rapid Microscale Analyses with an External Ion Source Fourier Transform Ion Cyclotron Resonance Mass Spectrometer," Int'l J. of Mass Spectrom. and Ion Processes, Elsevier Scientific Publ (Amsterdam, NL), vol. 157 ( No. 15), p. 391-403, (Dec. 20, 1996).

Dey, et al., "Determination of Molecular Weight Distributions of Polymers by MALDI-FTMS," Anal. Chem, Amer. Chem. Soc. (Columbus, US), vol. 67 ( No. 9), p. 1575-1579, (May 1, 1995).

* cited by examiner

SUBSTITUTE SHEET (RULE 26)

FOURIER TRANSFORM MASS SPECTROMETER AND METHOD FOR GENERATING A MASS SPECTRUM THEREFROM

FIELD TO THE INVENTION

This invention relates to a method of generating a mass spectrum in a Fourier Transform Mass Spectrometer (FTMS), and to such a mass spectrometer.

BACKGROUND OF THE INVENTION

High resolution mass spectrometry is widely used in the detection and identification of molecular structures and the study of chemical and physical processes. A variety of different techniques are known for the generation of a mass spectrum using various trapping and detection methods.

One such technique is Fourier Transform Ion Cyclotron Resonance (FT-ICR). FT-ICR uses the principle of a Cyclotron, wherein a high frequency voltage excites ions to move in spiral orbits within an ICR measurement cell. The ions in the cell orbit as coherent bunches along the same radial paths but at different frequencies. The frequency of the circular motion (the Cyclotron frequency) is proportional to the ion mass. A set of detector electrodes are provided and an image current is induced in these by the coherent orbiting ions. The amplitude and frequency of the detected signal are indicative of the quantity and mass of the ions. A mass spectrum is obtainable by carrying out a Fourier Transform of the "transient", that is, the signal produced at the detector's electrodes.

An attraction of FT-ICR is its ultrahigh resolution (up to 1,000,000 in certain circumstances, and typically well in excess of 100,000). However, relative to other known mass spectrometry techniques, such as Time Of Flight Mass Spectrometry (TOF-MS), or 3-D (Paul type) traps, FT-ICR Mass Spectrometry (hereinafter referred to as FTMS) provides particular challenges if a meaningful mass spectrum is to be obtained, particularly at a high resolution. For example, as detailed in our co-pending patent application number GB0305420.2, it is important to optimise various system parameters.

Compared with other methods of mass spectrometry, FTMS allows a relatively narrow range of mass to charge (m/z) ratios to be captured in the measurement cell during any particular scan. Partly, this is a result of the need to place the cell within the bore of a superconducting magnet. A further difficulty is caused by the manner of injection of ions into the measurement cell. Ions are supplied to the measurement cell from an external source. Electrostatic injection to the cell, or the use of a multipole injection arrangement (see U.S. Pat. No. 4,535,235) result in a time of flight spread in the ions as they pass from the previous, ion storage stage, into the FTMS measurement cell. Although the techniques described in the above referenced GB0305420.2 help to minimise this time of flight spread, some spreading is inevitable and this means that the lighter, faster ions arrive at the cell sometime before the heavier, slower ions. As a consequence, if the cell is opened and closed shortly after the ions are ejected from the previous stage ion storage, ions of smaller m/z tend to be captured. If the cell is left open for a longer period, to attempt to capture slower ions having a higher m/z, then the lighter ions that have arrived at the cell tend to be lost.

It would accordingly be desirable for a method and apparatus to be provided which would allow a wider range mass spectrum to be generated in FTMS.

SUMMARY OF THE INVENTION

Against this background, the present invention provides, in a first aspect, a method of generating a mass spectrum from a Fourier Transform Mass Spectrometer (FTMS), comprising the steps of: (a) generating ions to be analysed by the FTMS; (b) capturing a first quantity of the generated ions in an FTMS measurement cell, the first quantity including ions having a first range of m/z ratios; (c) detecting the captured ions within the said first range and producing a first output signal containing information regarding the m/z ratios of the ions in that first range; (d) capturing at least one further quantity of the generated ions in the measurement cell, the or each further quantity including ions having a corresponding further range of m/z ratios which is at least partly different to that of the first range and of any other further ranges which may have been captured in the measurement cell; (e) detecting the captured ions within the or each further range and producing a corresponding further output signal or signals containing information regarding the m/z ratios of the ions in the or each corresponding further range; and (f) combining, using processing means, the first output signal with the at least one further output signal so as to produce a composite mass spectrum including m/z ratios from within each of the ranges that are combined.

By "stitching together" measurements of ions having different ranges of mass to charge ratios, a single, composite relatively broad range spectrum can be obtained. Although the ranges of mass to charge ratios captured in the first and the one or more further scans do not necessarily need to overlap one another, it is particularly preferably that they do so. This is because the ratio of ions of a given mass to charge ratio that are ejected from the ion storage device to the total number of those ions which are captured by the measurement cell is not constant across the range of mass to charge ratios that can be captured in a given scan. In particular, there is a lower and upper cut-off for mass to charge ratios in a given scan, but at the extremities of that range, a lower proportion of the ions leaving the ion storage device are actually captured by the measurement cell. It has been found, empirically, that the ratio, R, of the ions captured by the measurement cell, relative to the number of ions ejected from the ion storage device, between a lover cut-off $M_L$ and an upper cut-off $M_H$, rises relatively rapidly from zero (but not vertically), to a peak and then reduces to zero again at $M_H$. The consequence of this is that a mass spectrum generated only using a single scan also does not accurately reflect the relative quantities of ions generated by the ion source, that is, in essence, the relative quantities of ions of different m/z in a substance which is being analysed.

In a preferred embodiment, therefore, where two or more ranges are captured and detected and where these multiple ranges overlap with one another, the peak in the ratio R can effectively be stretched. In a particularly preferred embodiment, where multiple overlapping ranges are employed, a relatively flat portion in a plot of R against m/z can be obtained over a relatively wide range of m/z. As a consequence of this, a mass spectrum which is not only of wider range than was previously available in FTMS can be obtained, but that mass spectrum may also, advantageously, more accurately reflect the relative abundances of ions in the substance which is being analysed (as indicated by the relative height of the peaks in the mass spectrum).

Although manual configuration of the FTMS and the processing means may be carried out, in particularly preferred embodiments, the processing means is configured to determine the number and degree of overlap of scans to be stitched together based on one or more predefined conditions. For example, a predefined maximum number of scans may be allowed, based upon a maximum acceptable time to produce a composite mass spectrum. Additionally or alternatively, and particularly where a specific, known range of mass to charge ratios is to be obtained, the processing means may be configured automatically to determine the number of scans and, moreover, the start point of the scan in respect of the lowest range, and the end point of the scan in the highest range of m/z ratios. The latter procedure is desirable because of the non-linear nature of the ratio R as explained above. For example, if a range of mass to charge ratios between 500 and 1500 Da is to be examined, it is advantageous to obtain a scan of a first range below this minimum in the actually desired mass range, for example, the first range might start at, say, 250 Da. Likewise, the range at the other end of the plurality of scans might include ions having an m/z ratio up to 2000 Da. When combined, the ends of the spectrum can be automatically truncated to show just the range actually of interest (in this example, 500-1500 Da) but, importantly, the ratio R as defined above will be relatively flat across this range since it is away from the actual start and finish of the total scanned range.

A further predefined condition may be to minimise the total number of ranges that are captured (since this will reduce the total time to generate a composite mass spectrum ("dynamic minimisation")). This allows the maximum number of opposite spectra to be generated in a given time period, when multiple composite spectra are to be generated.

In one preferred embodiment, the output signals generated by the FTMS are transients in the time domain, and it is these which are added together to produce a composite transient which is then, finally, converted into a composite mass spectrum by employing a single Fourier Transform on the composite transient. Alternatively, again where each output signal is an FTMS transient, each one may separately be converted to the frequency or mass domain and then stitched together in that domain to produce the composite mass spectrum there.

Either way, when the composite mass spectrum has been obtained, the information (in the form of the output signals) which was obtained in producing this composite mass spectrum may be discarded so that only the composite mass spectrum is saved. This is advantageous as it reduces the amount of data (which, for FTMS, may be extremely large) which is stored by a data storage device in communication with the processing means.

There are several ways to achieve a series of at least partially non-overlapping ranges captured in the plurality of scans which are combined. In a preferred embodiment, an ion storage device is employed between the ion source and the measurement cell. This may, for example, be a linear trap (LT). The LT captures ions directly or indirectly (i.e. following further upstream mass filtering/ion guiding devices) from the ion source. The LT is able to store ions having a relatively broad range of mass to charge ratios. In one alternative, the ion storage device may be emptied and refilled with ions having a broadly similar stored range of mass to charge ratios in each scan cycle (which stored range may be a broad or narrow subset of the range generated by the ion source). In that case, the ion transfer parameters between the LT and the measurement cell are adjusted between scans so that different ranges of the m/z ratios of the ions stored in the LT are captured by the cell in different scans. These different ranges may or may not overlap one another. Transfer parameters may be adjusted, for example, by gating the ions ejected from the LT into the measurement cell at different times, based, for example, on time of flight from the LT to the measurement cell.

As an alternative, the LT or other storage device may operate in mass filter mode (or may store ions of a narrow range of m/z ratios already pre-filtered in an upstream location) so as to store, in each scan, ions of a select narrow range of m/z ratios (that is, only a part of the overall range of mass to charge ratios of ions generated by an ion source are stored). In that case, as an additional or alternative approach to adjusting the transfer parameters between the ion storage device and the measurement cell, the ion storage device may wholly or in part define the range of m/z ratios of ions captured and detected in the measurement cell in separate scans.

In a second aspect of the present invention, there is provided a Fourier Transform Mass Spectrometer (FTMS) comprising: an ion source for producing ions whose mass to charge (m/z) ratio is to be determined; an FTMS measurement cell, arranged to receive ions generated by the ion source and to capture a proportion thereof; detector means, for detecting ions captured in the FTMS measurement cell and for producing an output signal containing information regarding the m/z ratios of the detected ions; and a processor, configured to process an output signal received from the detector means; wherein: (i) in a first scan, the FTMS measurement cell is arranged to capture a first proportion of ions generated by the ion source, the first proportion having a first range of m/z ratios within the ranges generated by the ion source, and the detector means is arranged to output a first output signal containing information regarding that first range of m/z ratios; wherein: (ii) in at least one further scan, the FTMS measurement cell is arranged to capture a further proportion or proportions of ions generated by the ion source, the or each further proportion having further range(s) of m/z ratios within the range generated by the ion source, the or each of which further range(s) at least partially do not overlap with the first range, and the detector means is arranged to output a corresponding one or more further output signal(s) containing information regarding the or those respective further range(s) of m/z ratios; and further wherein: (iii) the processor is configured to combine the first output signal with the at least one further output signal so as to produce a composite mass spectrum including m/z ratios from within each of the ranges which are combined.

Where the ion storage device is a linear trap (LT), and in the former embodiment where control of the range of m/z ratios of ions captured by the measurement cell is by control of the ion transfer parameters, that control may in turn be done by adjusting the times of flight from the linear trap to the measurement cell. A more straightforward method, however, is to maintain the ion transfer parameters between the linear trap and the measurement cell, and gate the cell opening and closing times differently so as to capture ions having different ranges of mass to charge ratios.

Further advantageous features of the invention are set out in the claims which are appended hereto.

BRIEF DESCRIPTION OF THE DRAWINGS

The invention may be put into practice in a number of ways, and one embodiment will now be described by way of example only and with reference to the accompanying drawings in which.

DETAILED DESCRIPTION OF A PREFERRED EMBODIMENT

Figure 1:
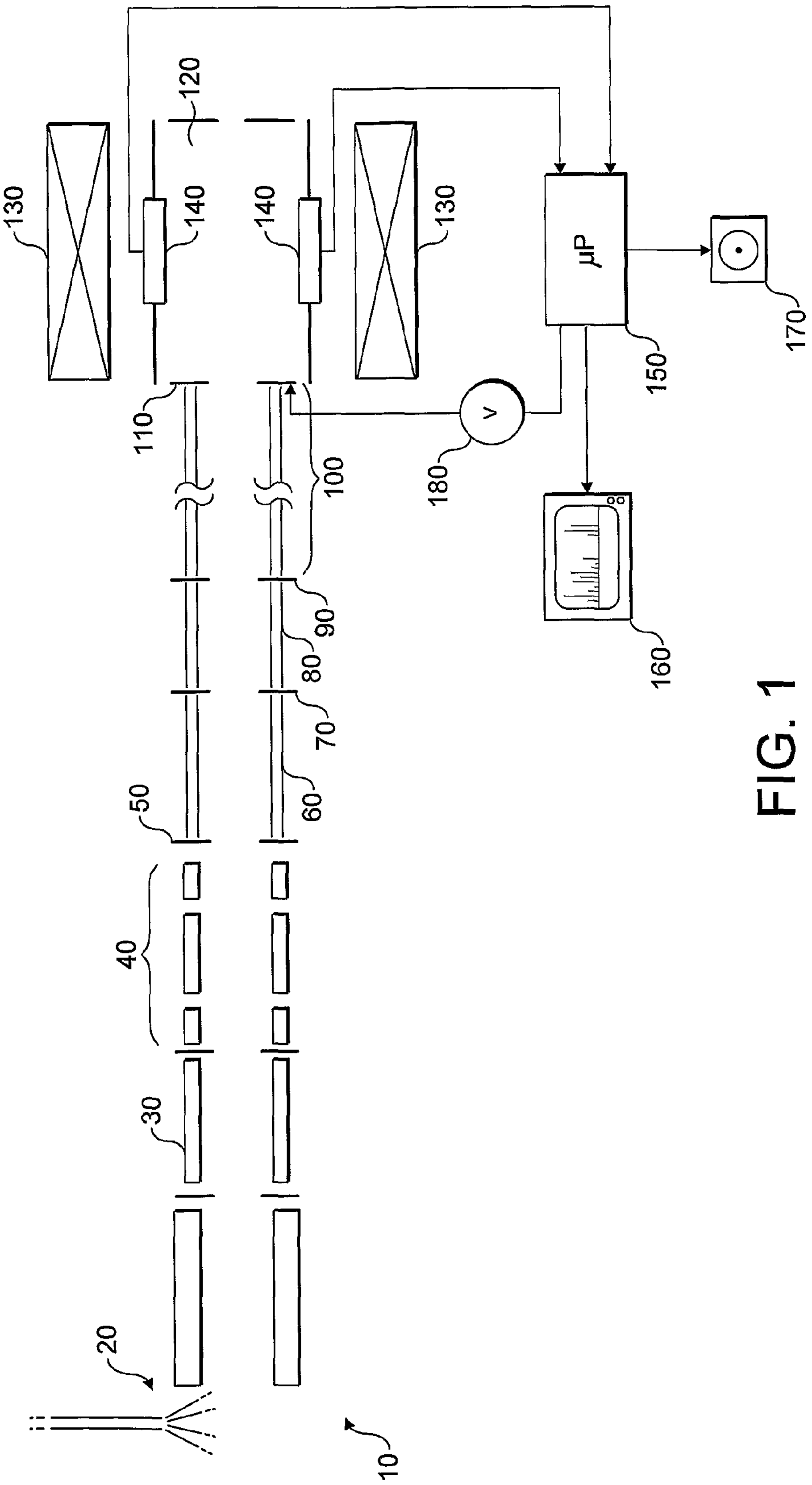
FIG. 1 shows a schematic diagram of a Fourier Transform Mass Spectrometer (FTMS) suitable for implementing an embodiment of the present invention and including a linear trap and an FTMS measurement cell.

Referring first to FIG. 1, a highly schematic arrangement of a mass spectrometer system 10 for implementing the present invention is shown.

Ions are generated in an ion source 20, which may be Electrospray Ion Source (ESI), Matrix-assisted Laser Ion Desorption Ionisation (MALDI) source, or the like. In preference, the ion source is at atmospheric pressure.

Ions generated at the ion source 20 are transmitted through a system of ion optics such as one or more multipoles 30 with differential pumping. Differential pumping to transfer ions from atmospheric pressure down to a relatively low pressure are well known as such in the art and will not be described further.

Ions exiting the multipole ion optics 30 enter an ion trap which may be a 2-D or 3-D RF trap, a multipole trap or any other suitable ion storage device including a static electromagnetic or an optical trap. In preference, however, the ion trap is a linear trap (LT) 40.

Ions are ejected from the LT 40, through a first lens 50 into a first multipole ion guide 60, through a second lens 70 into a second multipole ion guide 80, and through a third lens 90 into a third, relatively longer multipole ion guide 100, only a part of which is shown in FIG. 1. It is to be understood that the various components shown highly schematically in FIG. 1 are not drawn to any relative scale.

At the downstream end of the third multipole ion guide 100 is an exit/gate lens 110 which delimits the third multipole ion guide 100 and a measurement cell 120. The measurement cell 120 is a part of a Fourier Transform Ion Cyclotron Resonance (FT-ICR) mass spectrometer. The measurement cell 120 comprises, typically, a set of cylindrical electrodes (not shown separately in FIG. 1), to allow application of an electric field to ions within the cell that, in combination with a magnetic field produced by a superconducting magnet 130, causes cyclotron resonance as is well understood by those skilled in the art.

The measurement cell 120 includes detectors 140 which detect ions as they pass in cyclotron orbits within the measurement cell 120. Typically, detection is carried out by generation of an image current, as will be again familiar to those skilled in the art.

Further details of the arrangement of a preferred mass spectrometer as depicted schematically in FIG. 1 may be found in the above referenced GB0305420.2.

The output of the detectors 140 is passed to a processor 150 which may be a dedicated part of the mass spectrometer 10 or may, alternatively, be a part of a separate but connected personal computer, for example. The procedures carried out by the microprocessor will be described in further detail below. The processor 150 is connected to a screen 160 and to a data storage device 170. The microprocessor is also connected to a voltage controller 180 which controls the voltage upon the exit/gate lens 110 so as to open or close that exit/gate lens 110 as appropriate (see below). Although not shown in FIG. 1, the processor 150 may also or instead be connected to a further voltage controller which controls the voltage upon the lenses 50, 70, 90 and/or the multipole ion guides 60, 80, 100.

In use, ions of a substance to be analysed are generated at the ion source 20 and passed through the device into the linear trap 40. This is able to store ions having a wide range of mass to charge ratios, well in excess of the range that may be stored by the measurement cell 120. Ions stored in the linear trap 40 are ejected by altering the potentials on, for example, the exit lens 50 of the linear trap 40 and pass through the multipole ion guide towards the measurement cell 120. As a consequence of time of flight or other ion transfer effects, ions with differing m/z values arrive at the measurement cell 120 at different times. Since it is not possible to capture all of the ions ejected from the linear trap 40, in accordance with preferred features of the present invention, a first range of mass to charge ratios is captured by the measurement cell 120 in a first scan. This is achieved by, for example, adjusting the voltage on the exit/gate lens 110 so as to open the measurement cell at a time $t_1$ and close it again at a time $t_2$. The manner in which the timing decisions is made will be described in further detail in connection with FIG. 4 below.

Once ions of a first range of mass to charge ratios have been gated into the measurement cell 120, they are detected in accordance with well known procedures using the detectors 140. The detectors produce a transient which is passed to the microprocessor 150. In a first embodiment, this transient of the first scan is stored as such (that is, it is maintained in the time domain) upon the data storage 170. In an alternative embodiment, however, the processor 150 applies a Fourier Transform to the transient obtained from the detectors 140 and stores the resultant mass spectrum temporarily upon the data storage 170.

Following detection and temporary storage of a first set of data, either as a transient or as data in the frequency/mass domain, the measurement cell 120 is emptied and a next set of ions is gated into it from the linear trap 40. The ions captured by the measurement cell 120 are, this time, captured in a different time range $t_3$-$t_4$. Although the time range $t_3$-$t_4$ may not overlap the first time range $t_1$-$t_2$ for the first scan, in preference, there is a degree of overlap so that, for example, $t_2>t_1$ and $t_4>t_3$, but $t_2>t_3$. The reason for this will be understood by reference to FIGS. 2, 3*a* and 3*b* below.

Further scans may optionally be carried out over differing time ranges so as to capture ions having potentially a wide variety of mass to charge ratios. After each scan, the transient or alternatively the data in the frequency/mass domain is stored, temporarily, upon the data storage 170.

Once the scans have been completed (either due to user definition of the number of scans to be carried out, or through application of an algorithm to be described which decides upon the number of scans to be completed), the processor 150 applies a calculation to the data stored upon the data storage 170 so as to combine that stored data and produce a single, composite mass spectrum. This may be achieved either through combining the transients for each scan that has been carried out, and then applying a Fourier Transform to that combined transient, or alternatively by combining data in the mass domain so as to produce a composite mass spectrum.

Addition of transients (or complex frequency spectra) requires particular consideration, so as to avoid frequency or phase variations between transients. Phase coherence may be achieved, for example, by ensuring that all excitation and detection sequences are exactly the same between scans, which would in turn typically be a result of appropriate control by suitable hardware or software. Elimination of frequency variations requires stabilisation of the total ion amount in the measurement cell, and of other parameters.

It is to be understood that (at least in comparison with other mass spectrometric techniques), the mass spectrum produced during each scan is potentially of ultra-high resolution. As a consequence, addition is not necessarily immediately straightforward, since the mass resolution may be higher than the repeat accuracy, particularly when employing chromatography and ultra-high resolution. One way in which this may be addressed is to employ automatic regulation of ion currents, with fine corrections of mass. A suitable technique is described in commonly assigned co-pending application number GB0305420.2, filed on even date at the UK Patent Office and entitled 'A method of improving a mass spectrum'.

Having described, in general terms, the manner in which a composite spectrum may be obtained, the details of the automation of this process will now be described in connection with FIGS. 2, 3 and 4.

Figure 2:
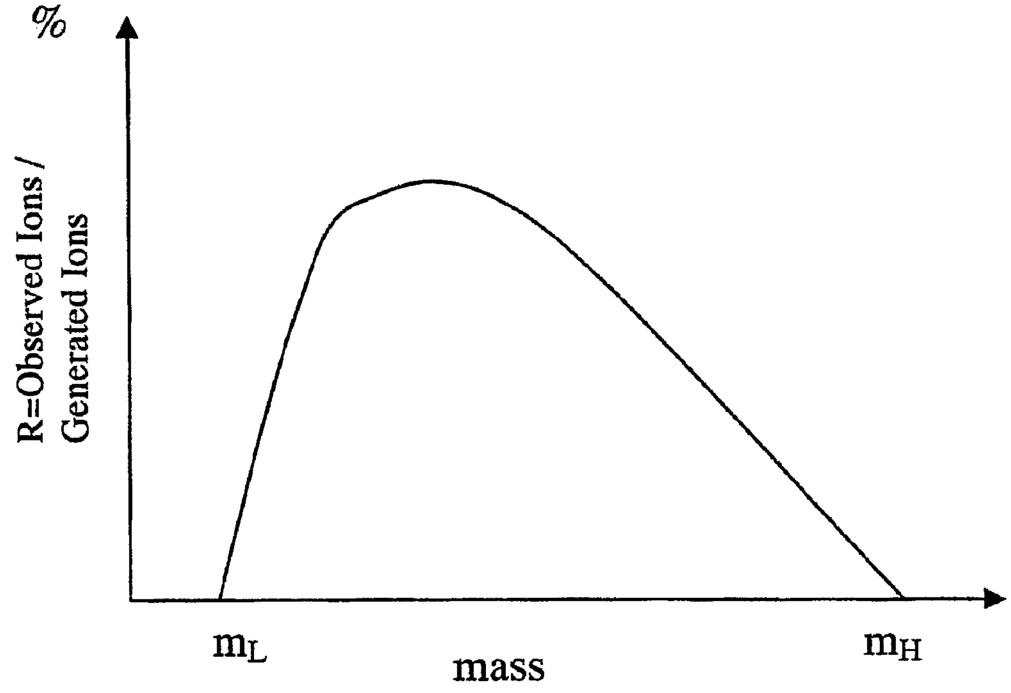
FIG. 2 shows, again schematically, a plot of the ratio R of the abundance of ions of a particular m/z in the linear trap of FIG. 1, to the abundance of ions of that m/z captured within the measurement cell, over a range of m/z ratios.

Referring first to FIG. 2, a plot of the ratio, R, of the number of ions within the LT 40, relative to the number of ions captured within the measurement cell 120 is shown, as a function of m/z. It will be seen that the ratio R starts at zero at a lower m/z cut-off $m_L$. It then rises to a peak before dropping again to zero at an upper cut-off $m_H$. The peak position is determined experimentally and the actual profile may be significantly different from the schematic shape of FIG. 2 which is for exemplary purposes only. The precise location of the peak varies with the actual values of $m_L$ and $m_H$. As a consequence of the profile shown in FIG. 2, it will be understood that the quantities of ions having an m/z between $m_L$ and $m_H$ but in the vicinity of those values will be relatively small and any peaks in a mass spectrum of this single scan will be suppressed in the vicinity of $m_L$ and $m_H$.

Figure 3A:
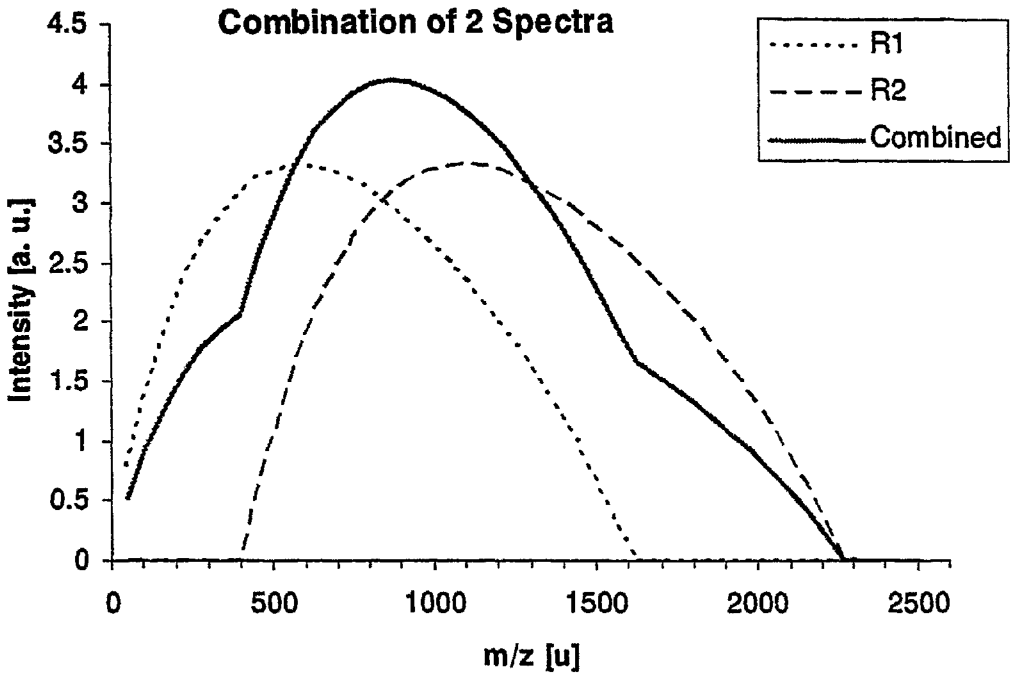
FIG. 3*a* shows this ratio R as a function of m/z when two, overlapping ranges are captured and combined.
Figure 3B:
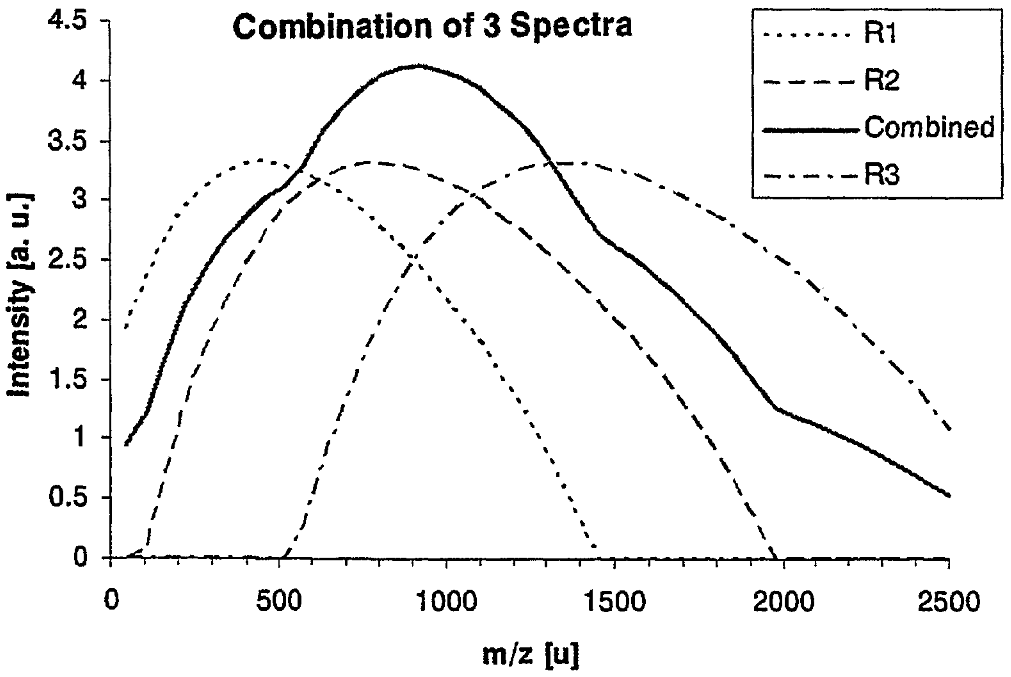
FIG. 3*b* shows a plot of that ratio R, again as a function of m/z, where three such overlapping ranges are combined.

Turning now to FIGS. 3*a* and 3*b*, the advantages of performing multiple scans and overlapping the resultant transients or mass domain data may be seen. The individual profiles of R versus (m/z) for two adjacent and overlapping scans are shown in FIG. 3*a*. The composite "envelope" is also shown for these two scans, in FIG. 3*a*. FIG. 3*b* shows the separate profiles of R versus (m/z) for three scans, in dotted line, and also the composite "envelope" for these three overlapping scans. It will be seen that the range of m/z where R is high (for example, greater than 50% of maximum) is much wider when several scans are combined, than with any individual scan. This in turn permits ions over a wider range of mass to charge ratios to be included in a single composite spectrum than was previously available in FTMS. Moreover, where one is testing for a particular substance having a known range of mass to charge ratios (perhaps as a result of MS/MS or $MS^n$), the total scan range may be somewhat wider than the range of mass to charge ratios expected for that particular substance. By the total scan range is meant the lowest mass to charge ratio of ions that will be detected in FIG. 3*a* or FIG. 3*b* from a scan at the lower end of the total range covered, and also the highest mass to charge ratio detected in another scan at the other end of the range.

The reason for this is apparent from FIG. 3*b* in particular: in that case the whole range of mass to charge ratios of ions that is expected will fall within the middle of the "x" axis of FIG. 3*b*, for example, where R is away from its minima. This in turn means that the relative peak heights in the composite mass spectrum will be much more accurately reflect the true relative quantities of ions of various m/z in the substance to be tested than if only a single scan were carried out.

The processor 150 is able to control the capture of ions having a range of mass to charge ratios in two modes: either manual mode or automatic mode. In the first, manual mode, a user is able to define various parameters from which in turn these individual scan parameters are calculated. For example, the user may define a maximum time for data collection, along with a mass range, from which the processor will determine, in accordance with an algorithm, the number of scans to carry out, the width of each scan in terms of a range of mass to charge ratios for each scan (and the range does not need to be of the same width for each scan), the degree of overlap of the scans if any (the scans may simply abut in some situations) and so forth. Once the user has input the desired parameters, and the processor 150 has calculated the number and range of scans, the processor controls the cycles of ejection of ions from the linear trap 40 into the measurement cell 120 by adjusting the voltages on the exit/gate lens 110, the lenses 50, 70, 90, and/or the multipole ion guides 60, 80, 100. In the preferred embodiment, the ions are ejected from the linear trap and passed through the lenses and multipole ions guides under similar conditions in each scan, and it is only the timing of the opening and closing of the exit/gate lens 110 that is altered between scans.

As an additional or alternative user defined parameter, the range of mass to charge ratios to be measured in the composite mass spectrum may be defined. The processor 150 then calculates, again on the basis of an algorithm, a total range of mass to charge ratios to be scanned which extends for a predetermined distance beyond the user defined range, for the reasons described above in connection with FIGS. 3*a* and 3*b* in particular. This in turn may be subject to further conditions, such as a maximum number of scans (which will determine the width of each individual scan, when a total mass to charge ratio range is also defined by a user), and/or the degree of overlap of adjacent scans, and so forth.

Where the mass range is user defined, it is also necessary to carry out a pre-calibration of the mass spectrometer in order to allow an absolute measurement of mass to charge ratio (rather than relative to other mass to charge ratios) to be obtained. This may be done by inserting a standard calibrant substance or mixture into the ion source 20, the standard calibrant having a series of peaks at known m/z positions. In preference, the processor 150 may have a calibration algorithm which has a fixed number of scans (say 4), each over a fixed timescale both in terms of the amount of time the measurement cell 120 is open to receive ions from the linear trap 40, and the relative open and close times between the four scans. From the resultant mass spectra, or indeed even from the resultant four transients, measurement cell opening and closing times can be calculated using an algorithm or a look-up table for any range of mass to charge ratios input by the user.

In an automatic mode, the mass range to be analysed in a series of scans may be automatically selected, based upon a parent mass and charge in data dependant experiments carried out beforehand. Likewise, in this automatic mode, the algorithm may decide the number of scans to be carried out as a result of the automatically determined mass range so that no user intervention at all is necessary and a composite mass spectrum is automatically generated for display upon the screen 160 and for storage on the data storage 170 without any user input being necessary.

The algorithm which makes the above decisions is either executed directly by the processor 150, or is executed elsewhere. Either way, the processor 150 controls the capture of ions in the measurement cell 120 by controlling the ion transfer parameters from the LT 40 to the measurement cell 120; for example, the processor may control the voltage on the exit/gate lens 110 to permit multiple successive scans over different time windows.

Figure 4:
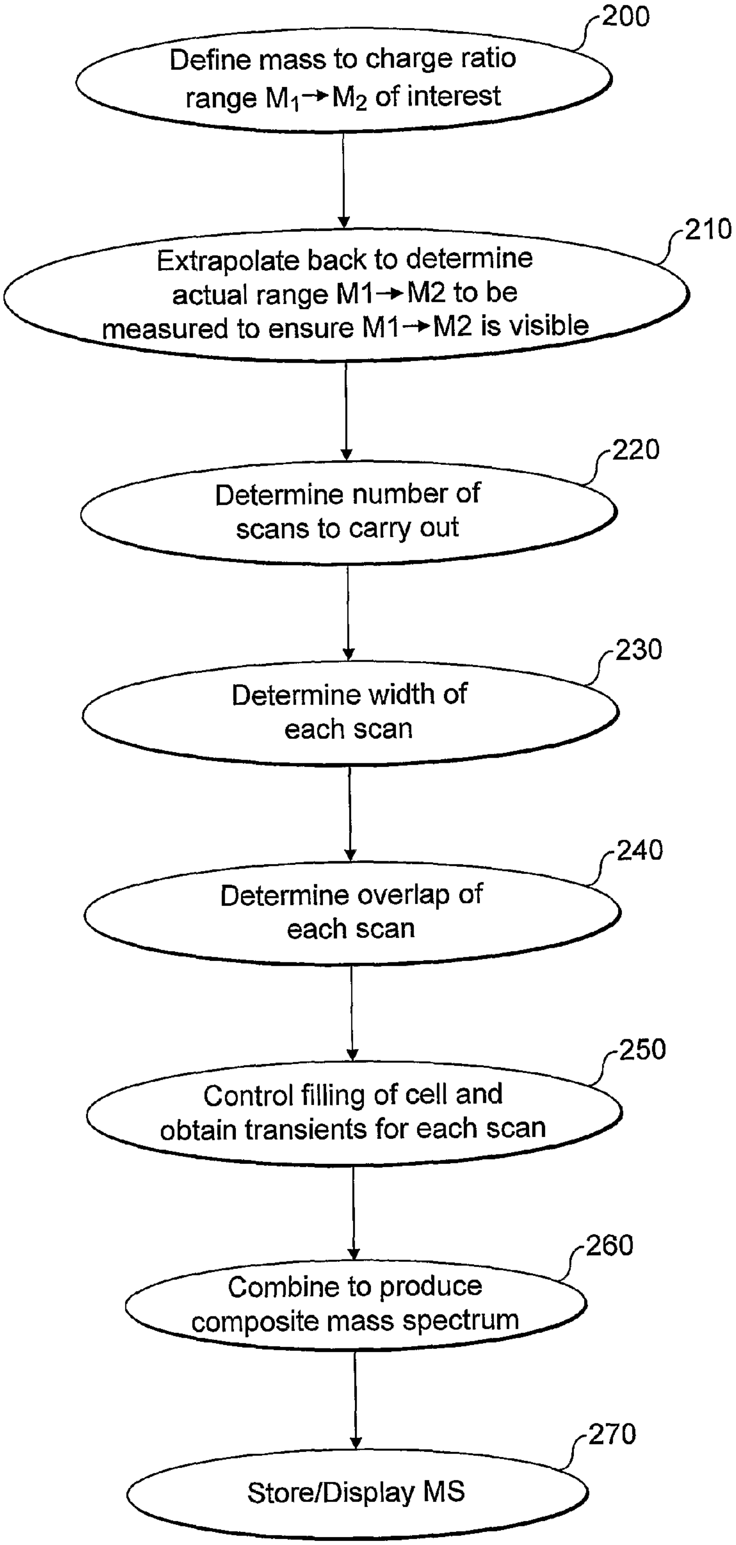
FIG. 4 shows a flowchart of the steps taken in producing a combined mass spectrum in accordance with an embodiment of the present invention.

The steps taken and the decisions made (either under control of a user, or automatically) by the algorithm are shown in FIG. 4. At a first step 200, the mass to charge ratio range $m_1$ to $m_2$ of interest is defined, either by a user or automatically as described above. At step 210, the algorithm extrapolates outwards to determine an actual range $m_1'$ to $m_2'$ which needs to be measured to ensure that the actual range of interest, $m_1$ to $m_2$ is towards the centre of the profile of FIG. 3*b*.

Once the actual range that needs to be measured has been determined at step 210, at step 220 the number of scans to be carried out is determined. This may be done automatically, using for example the "dynamic minimum" principle which maximises the total number of composite mass spectra that may be obtained in a given time period. Other parameters may be considered as well or instead in determining the appropriate stitching parameters. For example, pre-existing information on achievable mass windows at different ion abundances and/or mass ranges can be employed to set the mass ranges which are obtained to be stitched together. Alternatively, the stitching parameters may be user defined. In either case, the decision may be subject to a maximum number of allowed scans. Once the number of scans to be carried out has been determined, next, at step 230, the width of each scan is determined. Step 230 is optional in that the width of each scan may be fixed, depending upon the instrument parameters, the number of ions which may be held within the measurement cell for a given scan, the $MS^n$ stage and so forth. All, or just some, of the scans to be carried out may have a different width.

At step 240, the degree of overlap of each scan is calculated. Again, this is an optional further decision in that the degree of overlap may again be fixed subject to preceding decisions. Alternatively, it may be desirable to adjust the degree of overlap, for example, subject to the constraint that the flatness of the response (that is, the flatness of the peak in the R versus (m/z) response shown in FIG. 3*b*) is maximised. Clearly, the number of scans to be carried out will also affect this flatness and may therefore affect the decision at 230.

Once the decisions in steps 200 to 240 have been completed, the algorithm next causes the processor 150 to carry out the scans by controlling the exit/gate lens 110 in turn to control the filling of the measurement cell 120 for the individual scans. At each stage, the transients detected at the detectors 140 are stored, temporarily, in the data storage 170. At step 260, following completion of the final scan, the transients or mass domain data stored temporarily in the data storage are combined to produce a composite mass spectrum which, at step 270, is either stored in the data storage 170 and/or displayed upon the display 160. The data for the individual scans is then deleted from the data storage 170 to maximise storage space thereupon. Alternatively (and preferably), intermediate data may be held in random access memory and automatically discarded on completion of the sequence. It may be desirable to keep only the latest scan and the sum of the previous scans in memory.

Figure 5A:
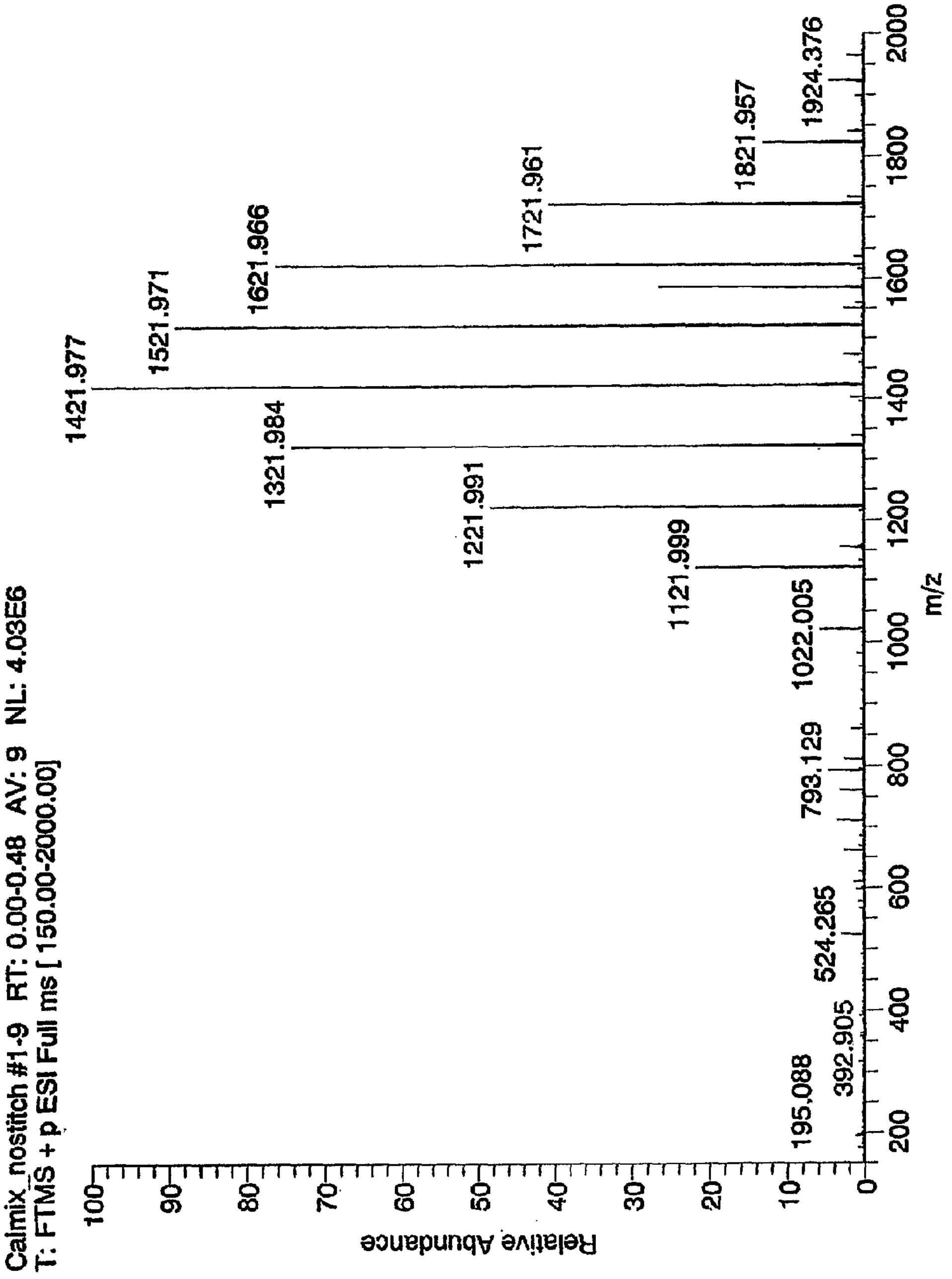
FIG. 5*a* shows a prior art mass spectrum obtained over the approximate range 200-2000 Da.
Figure 5B:
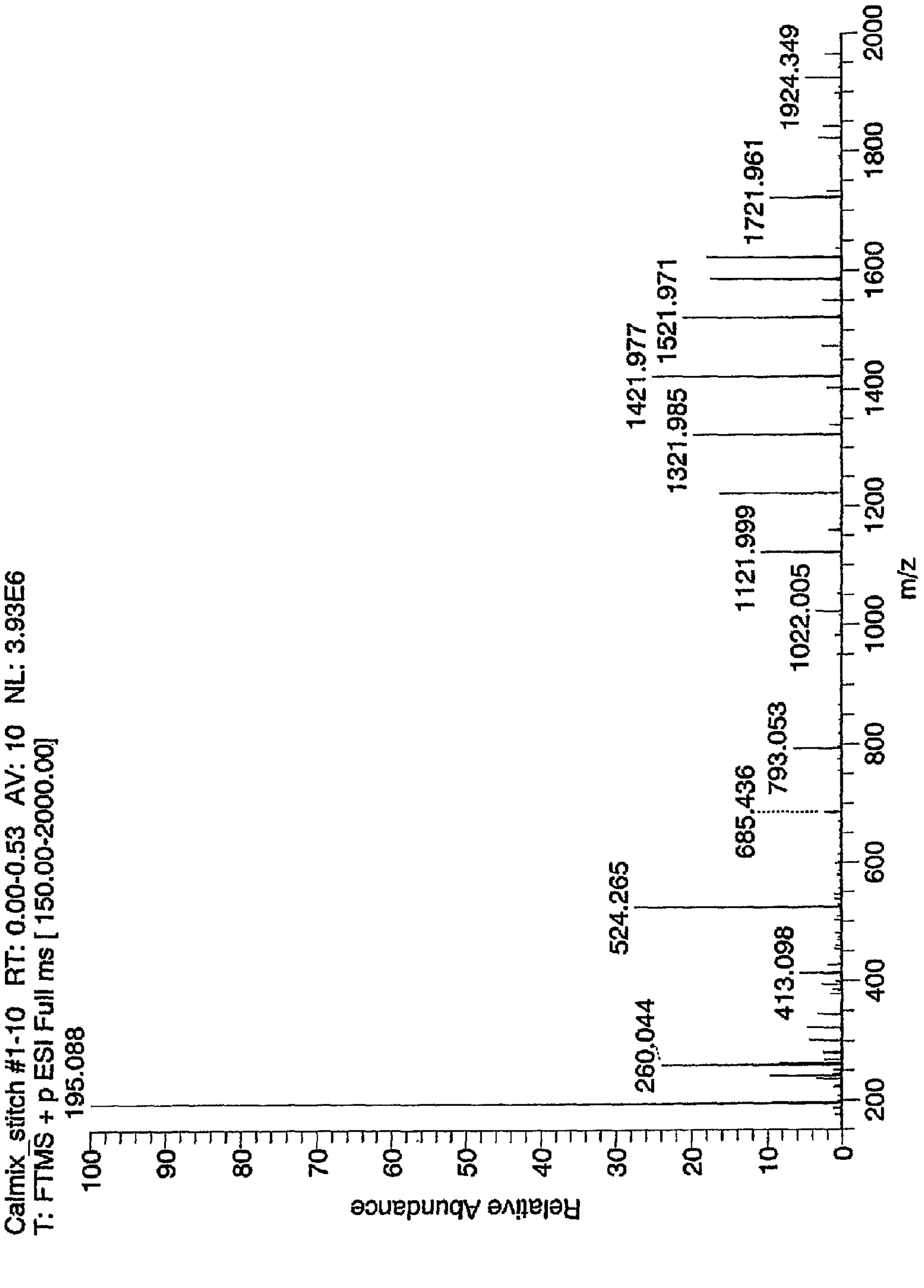
FIG. 5*b* shows a mass spectrum over a similar range but applying the techniques of embodiments of the present invention.

An example of a genuine mass spectrum obtained from a standard calibration mixture is shown in FIGS. 5*a* and 5*b*. The calibration mixture contains caffeine (m/z=195), MRFA (m/z=524 when singly charged, m/z=260 when doubly charged) ultramark (m/z 921, 1021, . . . 1921). FIG. 5*a* shows a spectrum obtained using four single scans which are co-added under exactly the same conditions. FIG. 5*b* is the result of four scans over separate ranges, stitched together to provide a combined mass spectrum. To illustrate the effect of the R versus (m/z) profile of FIG. 2 relative to the profile of FIGS. 3*a* and 3*b*, the mass range in FIGS. 5*a* and 5*b* is identical, although, of course, in the latter case the actual total range of m/z ratios captured will be somewhat wider than 200-2000 Da, with the ends of the range then being truncated.

It will be seen that, even though the same peaks are present in FIGS. 5*a* and 5*b*, their relative heights are very different. For example, in FIG. 5*a*, which uses a single scan, the peak at 195.088 is close to the background. With the combined mass spectrum of FIG. 5*b*, however, the peak at 195.088 is much larger than subsequent peaks. The relative abundances of ions are much more accurately reflected in the mass spectrum of FIG. 5*b* than in the mass spectrum of FIG. 5*a*.

Although one specific embodiment of the invention has been described, it will be understood by those skilled in the art that various modifications may be contemplated without departing from the scope of the invention which is defined in the accompanying claims. For example, the approach set out in the foregoing (generation of a combined mass spectrum) could equally be applied to the so-called Orbitrap FTMS, which is described in, for example, WO-A-02/078046.

The invention claimed is:

1. A method of generating a mass spectrum from a Fourier Transform Mass Spectrometer (FTMS), comprising the steps of:

(a) generating ions to be analysed by the FTMS;

(b) determining, using processing means, an optimum number of ranges of generated ions to be captured in an FTMS measurement cell based upon a calibrant mass spectrum;

(c) capturing a first quantity of the generated ions in an FTMS measurement cell, the first quantity including ions having a first range of m/z ratios;

(d) detecting the captured ions within the said first range and producing a first output signal containing information regarding the m/z ratios of the ions in that first range;

(e) capturing at least one further quantity of the generated ions in the measurement cell, the or each further quantity including ions having a corresponding further range of m/z ratios which is at least partly different to that of the first range and of any other further ranges which may have been captured in the measurement cell, the number of further quantities being based on the optimum number of ranges determined;

(f) detecting the captured ions within the or each further range and producing a corresponding further output signal or signals containing information regarding the m/z ratios of the ions in the or each corresponding further range; and (g) combining, using said processing means, the first output signal with the at least one further output signal so as to produce a composite mass spectrum including m/z ratios from within each of the optimum number of ranges that are combined.

2. The method of claim 1, wherein each output signal is an FTMS transient in the time domain, the method further comprising combining each FTMS transient to produce a composite FTMS transient, still within the time domain, and then carrying out a Fourier Transform into the spectral domain so as to produce the said composite mass spectrum.

3. The method of claim 1, wherein each output signal is an FTMS transient in the time domain, the method further comprising carrying out a Fourier Transform upon each transient, separately, so as to produce a plurality of separate spectra in the frequency domain, and then combining those separate spectra using the said processing means so as to produce the said composite mass spectrum.

4. The method of claim 1 further comprising storing generated ions in an ion storage device, prior to the said step of capturing ions in the FTMS cell, and ejecting at least one of the first quantity and the at least one further quantity of the generated ions from the ion storage device to the measurement cell for capture thereby.

5. The method of claim 4, further comprising:

storing a first plurality of the generated ions in the ion storage device, having a first stored range of mass to charge ratios;

ejecting at least some of the first stored plurality of ions from the ion storage device, in a first scanning cycle, such that the measurement cell captures the said first quantity of ions, their first range of m/z ratios representing a sub set of the said first stored range of mass to charge ratios;

storing at least one further plurality of the generated ions in the storage device, each having a corresponding further stored range of mass to charge ratios; and ejecting at least some of the further stored plurality of ions from the ion storage device in at least one further scanning cycle, such that the measurement cell captures the said at least one further quantity of ions having the said further range of m/z ratios.

6. The method of claim 5, wherein the first stored range of mass to charge ratios substantially corresponds with the or each further stored range of mass to charge ratios, the method further comprising controlling parameters of ejection from the ion storage device and/or parameters of capture in the measurement cell so as to capture a different range of m/z ratios in the first and the or each further scan cycles.

7. The method of claim 5, wherein the first stored range of mass to charge ratios is substantially different to the or each further stored range of mass to charge ratios.

8. The method of claim 4, wherein the ion storage device is a linear trap (LT), and wherein the ions stored in the trap have a time of flight from the LT to the measurement cell dependent upon their m/z, the method further comprising:

capturing said first quantity of ions as a result of their time of flight to the cell; and capturing said at least one further quantity of ions as a result of a different time of flight to the cell.

9. The method of claim 1, wherein a mass to charge ratio range to be covered by the composite mass spectrum is user definable.

10. The method of claim 1, wherein the determination of the total number of ranges that are to be captured in the measurement cell, and the total number of output signals that are to be obtained, is based upon at least one predefined condition.

11. The method of claim 10, wherein the at least one predefined condition includes a maximum allowable total time to obtain data.

12. The method of claim 10, wherein the at least one predefined condition includes a maximum allowable number of separate captured ranges.

13. The method of claim 10 wherein the at least one predefined condition includes the total range of mass to charge ratios to be included within the said composite mass spectrum.

14. The method of claim 10, wherein the at least one predefined Condition further includes the requirement to otherwise minimise the total number of ranges that are captured in the measurement cell.

15. The method of claim 1 further comprising automatically selecting a mass to charge ratio range to be covered by the composite mass spectrum by the processing means.

16. The method of claim 1 wherein the first range of m/z ratios overlaps with the, or a one of the, further ranges of m/z ratios.

17. The method of claim 16, wherein the amount of ions of a given m/z captured in a given one of the ranges relative to the number of ions of that m/z that are generated varies with m/z within that range.

18. The method of claim 1, further comprising:

generating calibration ions having a known range of m/z ratios;

capturing and detecting groups of generated ions having a plurality of ranges of mass to charge ratios in the measurement cell, so as to produce a plurality of calibrant output signals each of which represents a proportion of the range of the calibration ions; and generating said calibrant mass spectrum from the calibrant output signals, said calibrant mass spectrum comprising a composite calibrant mass spectrum.

19. The method of claim 1 further comprising discarding the first and any further output signals from the measurement cell once the said composite mass spectrum has been generated.

20. A Fourier Transform Mass Spectrometer (FTMS) comprising:

an ion source for producing ions whose mass to charge (m/z) ratio is to be determined;

an FTMS measurement cell, arranged to receive ions generated by the ion source and to capture a proportion thereof;

detector means, for detecting ions captured in the FTMS measurement cell and for producing an output signal containing information regarding the m/z ratios of the detected ions; and a processor, electronically connected to the detector means, configured to determine an optimum number of ranges of generated ions to be captured in the FTMS measurement cell based upon a calibrant mass spectrum and to process an output signal received from the detector means;

wherein:

(i) in a first scan, the FTMS measurement cell is arranged to capture a first quantity of ions generated by the ion source, the first quantity having a first range of m/z ratios within the ranges generated by the ion source, and the detector means is arranged to output a first output signal containing information regarding that first range of m/z ratios;

wherein:

(ii) in at least one further scan, the FTMS measurement cell is arranged to capture a further quantity or quantities of ions generated by the ion source, the or each further proportion quantity having further range(s) of m/z ratios within the range generated by the ion source, the or each of which further range(s) at least partially do not overlap with the first range, and the detector means is arranged to output a corresponding one or more further output signal(s) containing information regarding the or those respective further range(s) of m/z ratios, the number of said further quantity or quantities of ions being based on the optimum number of ranges determined;

and further wherein:

(iii) the processor is configured to combine the first output signal with the at least one further output signal so as to produce a composite mass spectrum including m/z ratios from within each of the optimum number of ranges which are combined.

21. The FTMS of claim 20, wherein each output signal is an FTMS transient in the time domain and wherein the processor is configured to combine each FTMS transient to produce a composite FTMS transient, still within the time domain, and then carry out a Fourier Transform into the frequency or mass domain so as to produce the said composite mass spectrum.

22. The FTMS of claim 20, wherein each output signal is an FTMS transient in the time domain and wherein the processor is configured to carry out a Fourier Transform upon each transient, separately, so as to produce a plurality of separate spectra in the frequency or mass domain, and then combine those separate spectra so as to produce the said composite mass spectrum.

23. The FTMS of claim 20, further comprising an ion storage device between the said ion source and the said measurement cell, the storage device being arranged to store at least a proportion of the ions generated by the ion source, and to eject those stored ions from the storage device for transmission towards the measurement cell.

24. The FTMS of claim 23, further comprising ion transfer controller means electronically connected to the processor and to the ion storage device configurable to adjust ion ejection, transfer and/or capture parameters within and between the ion storage device and the measurement cell.

25. The FTMS of claim 24, wherein the ion storage device is arranged, in the first scan, to store ions from the ion source having a first stored range of mass to charge ratios, and, in the or each further scan, to store ions from the ion source having a corresponding further stored range of mass to charge ratios which substantially corresponds with the said first stored range, the ion transfer controller means being configured to control the capture parameters of the measurement cell in each scan so as to capture, in each scan, ions having the said at least partially non-overlapping ranges of mass to charge ratios.

26. The FTMS of claim 21, wherein the ion storage device is a linear trap (LT), arranged to eject ions for capture by the FTMS measurement cell.

27. The FTMS of claim 20, wherein the processor is configurable by a user to allow the said user to define one or more of the following conditions: the total scan time to produce the composite mass spectrum; the number of scans to be carried out; the total range of m/z ratios to be covered by the composite mass spectrum.

28. The FTMS of claim 20 further comprising data storage means electronically connected to the processor, configured to store only the composite mass spectrum, the data from each output signal and relating to the individual scans being discarded once the said composite mass spectrum has been generated.

29. The method of claim 6, wherein the ion storage device is a linear trap (LT), and wherein the ions stored in the LT have a time of flight from the LT to the measurement cell dependent upon their m/z, the method further comprising:

capturing said first quantity of ions as a result of their time of flight to the cell; and capturing said at least one further quantity of ions as a result of a different time of flight to the cell.

30. The FTMS of claim 24, wherein the ion storage device is a linear trap (LT), arranged to eject ions for capture by the FTMS measurement cell.

31. The method of claim 29 further comprising adjusting at least one parameter of transfer from the LT to the measurement cell, between the capture of the first and the capture of the at least one further quantity of ions, so as to ensure that the first range of m/z ratios is at least partly different to the or each further range of m/z ratios.

32. The method of claim 31, wherein the step of adjusting at least one parameter of transfer comprises adjusting an opening time and a closing time of the measurement cell between the steps (c) and (e) so as to capture ions having different m/z ratios by virtue of their differing times of flight from the LT.

33. The method of claim 15, wherein the step of automatically selecting a mass to charge ratio range is based upon a predefined condition.

34. The FTMS of claim 30, wherein the ion transfer controller means includes ion gating means for opening and closing an entrance to the measurement cell, the ions arriving at the cell from the LT at a time related to their m/z ratio; and wherein the processor is configured to control the gating means to open and close at differing times during different scans so as to allow capture of ions having different ranges of m/z ratios from the ions stored in the LT during those different scans.

* * * * *